United States Patent [19]

Fukuoka

[11] 4,183,642
[45] Jan. 15, 1980

[54] AUTOMATIC FOCUSING DEVICES

[75] Inventor: Kenji Fukuoka, Fussa, Japan

[73] Assignee: Olympus Optical Co., Ltd., Tokyo, Japan

[21] Appl. No.: 920,377

[22] Filed: Jun. 29, 1978

[30] Foreign Application Priority Data

Jul. 1, 1977 [JP] Japan .................................. 52-78849

[51] Int. Cl.$^2$ ............................ G03B 3/10; G03B 7/08
[52] U.S. Cl. ..................................................... 354/25
[58] Field of Search .......................... 354/25; 352/140; 355/56; 350/46; 356/4; 250/201, 209, 214 P, 578

[56] References Cited

U.S. PATENT DOCUMENTS

4,078,171   3/1978   Stauffer ............................. 354/25 X

Primary Examiner—Michael L. Gellner
Attorney, Agent, or Firm—Haseltine, Lake & Waters

[57] ABSTRACT

An automatic focusing device for cameras, microscopes and the like for automatically adjusting the focal point of a lens with the aid of an operational circuit. The operational circuit derives brightness information of adjacent picture elements, calculates differences in picture element brightness from this brightness information, and aids in the smoothness of brightness change associated with this difference for a number of picture elements. An accumulated value of this smoothness of brightness change is obtained for all picture elements, and the optical system is moved to make the accumulated value a maximum and to adjust the focal point accordingly.

6 Claims, 15 Drawing Figures

FIG. 5B  $Y_a \simeq Y_b$

AUTOMATIC FOCUSING DEVICES

BACKGROUND OF THE INVENTION

1. Field of the Invention

This invention relates to an automatic focusing device for cameras, microscopes or the like which can automatically adjust the focal point of a lens.

2. Description of the Prior Art

Heretofore, various automatic focusing devices for cameras, microscopes or the like have been proposed. In these conventional devices, all or part of an image formed on a screen by a lens is decomposed into a number of picture elements and informations such as brightness of these picture elements are used so as to adjust the focal point of the lens. As a result, the conventional devices comprise means for decomposing the image into the picture elements and means for processing informations obtained by each picture element. These process operations are too complex or too simple in contents to precisely adjust the focal point of the lens. For example, in one of the conventional devices, use is made of analog, digital or hybrid operations which are too complex to precisely adjust the focal point of the lens. In the other conventional deivce, the process operations are too simple to precisely adjust the focal point of the lens. In a further conventional device, the process operations are effected on the basis of Fourier transformation or variance, so that such conventional device is comlex in construction. As can be seen from the above, in the case of obtaining informations required for focusing the lens on the basis of the picture elements, a problem arises as to how to effect the process operation of the informations obtained from each picture element for the purpose of providing an image forming signal.

SUMMARY OF THE INVENTION

An object of the invention, therefore, is to provide an automatic focusing device for cameras, microscopes or the like which can precisely adjust a focal point of a lens with the aid of a simple operational circuit.

A feature of the invention is the provision in an automatic focussing device comprising means for processing a brightness signal of a picture element unit and providing an image forming signal and means for moving an optical system with the aid of said signal and automatically adjusting a focal point of said optical system, of the improvement comprising means for deriving m ($m \geq 3$) brightness informations of m adjacent picture elements, means for calculating difference of $(m-1)$th order with respect to the position of the picture element brightness with the aid of said m brightness informations, effecting an operation of providing smoothness of the brightness change associated with said difference of $(m-1)$th order and repeating said operation with respect to a number of picture elements, means for providing an accumulated value of said smoothness of the brightness change associated with said difference of $(m-1)$th order with respect to all picture elements, and means for moving an optical system so as to make said accumulated value maximum and adjusting the focal point of said optical system.

DETAILED DESCRIPTION OF THE PREFERRED EMBODIMENTS

Figure 1:
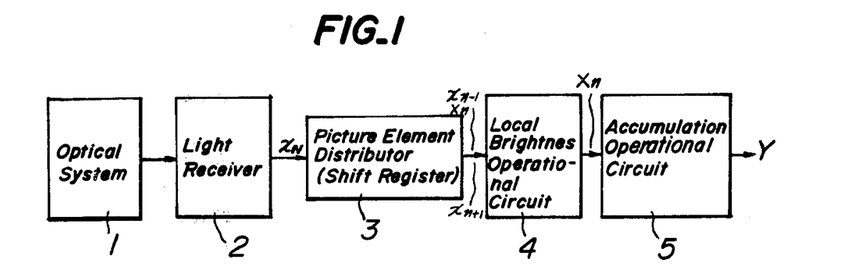
FIG. 1 is a block diagram showing a basic construction of an automatic focusing device according to the invention.

FIG. 1 is a block diagram showing a basic construction of an automatic focusing device according to the invention. Reference numeral 1 designates an optical system which receives light from an object (not shown) and forms an image of the object on a light receiver 2.

The light receiver 2 functions to convert the image into a brightness information of picture elements thereof and deliver such brightness information as its output. As the light receiver 2, use may be made of a vidicon camera, charge coupled device, photodiode array (the photodiodes may be arranged at random), mechanical scanner such as a pin hole scanner, rotary mirror or the like. The picture element brightness informations thus obtained are supplied in succession to a picture element distributor 3 including shift registers. The shift registers of the picture element distributor 3 function to deliver the brightness informations of the m adjacent picture elements in succession and parallel to a focal brightness operational circuit 4. The local brightness operational circuit 4 functions to operate and deliver the brightness change, that is, smoothness of contrast with respect to m adjacent picture elements. The operational result thus obtained is delivered to an accumulation operational means 5 which functions to accumulate the result with respect to m adjacent picture elements. Then, the optical system 1 is automatically operated so as to make the accumulated operational value maximum.

In the above described automatic focusing device according to the invention, a problem arises how to process the information obtained from each picture element, that is, how to process the brightness information of each picture element. It is the most important problem to determine that time at which focusing is completed with the aid of the kind of the brightness information obtained.

In the present invention, the image is considered to be in focus when the change of brightness in each point of the image, that is, the smoothness of contrast of the image becomes small. The present invention, therefore, makes use of the brightness of m adjacent picture elements and obtains difference of (m−1)th order. The image is considered to be in focus when the sum of the absolute values of the above mentioned (m−1)th difference, the sum of the square of the (m−1)th difference or the sum of the cube of the (m−1)th difference becomes large. As a result, the optical system 1 is operated so as to change its lens position. Then, the above mentioned sum is obtained with respect to respective lens positions and the image is considered to be in focus when the lens is located at that position at which the above mentioned sum becomes maximum.

Figure 2A:
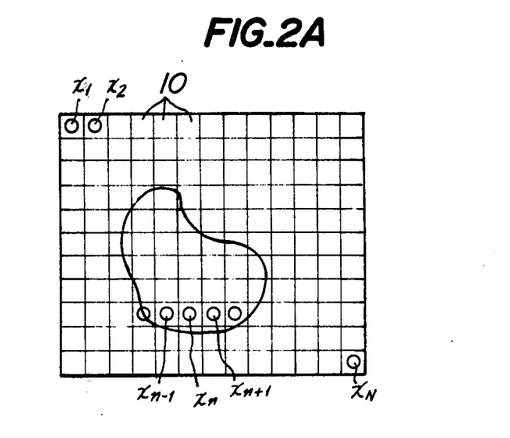
FIG. 2A is a diagrammatic view showing a light receiver shown in FIG. 1 and composed of a number of picture elements having respecture brightness.

For example, as shown in FIG. 2A, let respective brightnesses of all picture elements be $x_1, x_2 \ldots x_{n-1}, x_n, x_{n+1}, \ldots x_N$, the brightnesses of adjacent picture elements being designated by continuous numerical suffixes. If m=3, that is, if the brightnesses $x_{n-1}, x_n$ and $x_{n+1}$ (n=1, ... N) of 3 adjacent picture elements are processed in association with each other, in the first place an absolute value $X_n$ of difference of second order of the brightness around the nth picture element given by $$X_n = |x_{n-1} - 2x_n + x_{n+1}| \quad (1)$$

is obtained. Similarly, $X_n$ with respect to each n is obtained and the sum Y of $X_n$ with respect to each n is given by $$Y = \sum_n X_n \quad (2)$$

Figure 2B:
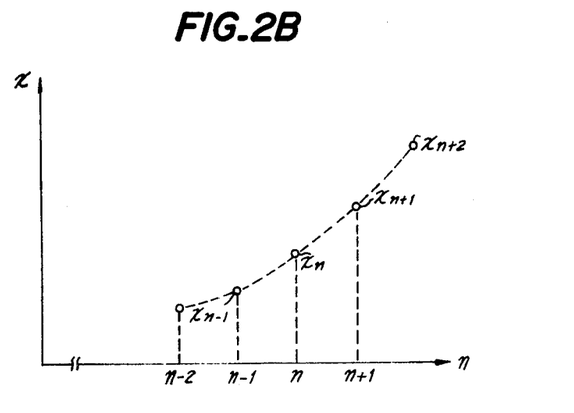
FIG. 2B is a graph illustrating the relation between the brightness and the picture element position.

The difference of second order obtained by the equation (1) is considered to represent the smoothness of the change in position of the brightness of the picture image. For example, if $x_{n-1}, x_n, x_{n+1}$ are aligned on one straight line drawn on a graph showing x taken on the ordinate as a function of n taken on the abscissa, $X_n$ becomes zero. The more $x_n$ is displaced the larger the value of $X_n$ becomes. As a result, the fact that the sum Y of the $X_n$ defined by the quation (2) is large shall be understood to means that the change in position of the picture image brightness is not smooth.

If m=4, that is, if the brightness $x_{n-1}, x_n, x_{n+1}$ and $x_{n+2}$ (n=1, ... N) of 4 adjacent picture elements are processed in association with each other, it is possible to obtain an absolute value of difference of third order of the brightness around the nth picture element given by $$X_n = |x_{n-1} - 3x_n + 3x_{n-1} - x_{n+2}| \quad (3)$$

If the sum Y of these $X_n$ is obtained by the equation (2), the larger the sum Y the smaller the smoothness of the picture image brightness. That is, the image is considered to be in focus.

Similarly, if the brightness of m adjacent picture elements are processed in association with each other, it is possible to obtain an absolute value of difference of (m−1)th order of the brightness around the nth picture element given by $$X_n = \left| \sum_{k=0}^{m-1} (-1)^k \binom{m-1}{k} x_{n+k-1} \right| \quad (4)$$

where $\binom{m-1}{k}$ is $_{m-1}C_k = \dfrac{(m-1)!}{k!(m-1-k)!}$

Whether or not the use of difference of what order is preferable to focusing relates to an accumulation method to be described later. It is preferable to select the difference of that order which is optimum to the purpose.

In the above described embodiment, in order to obtain the sum Y of $X_n$ with respect to each n, the $X_n$ with respect to each n is simply added by the equation (2). If the picture image is considered to be in focus when the smoothness of the change of the brightness at one portion of the picture image is extremely small, the following equations:

$$Y = \sum_n X^2_n \quad (5)$$

$$Y = \sum_n X^3_n \quad (6)$$

$$Y = \sum_n X^4_n \quad (7)$$

may be used instead of the equation (2) and the sum Y of $X_n^2, X_n^3, X_n^4$, etc. with respect to each n may be obtained. The optical system may be operated so as to make these sum Y of $X_n^2, X_n^3, X_n^4$, etc. large. Alternatively, one of the picture element position is made more influential than the other picture element positions or $$Y = \sum_n \sqrt{X_n}$$

may be used instead of the equation (2). Any other contrivances may be made for the purpose of obtaining the optimum signal for detecting the focal point positions. All or one portion of the picture elements constituting the picture surface may be processed.

Figure 3:
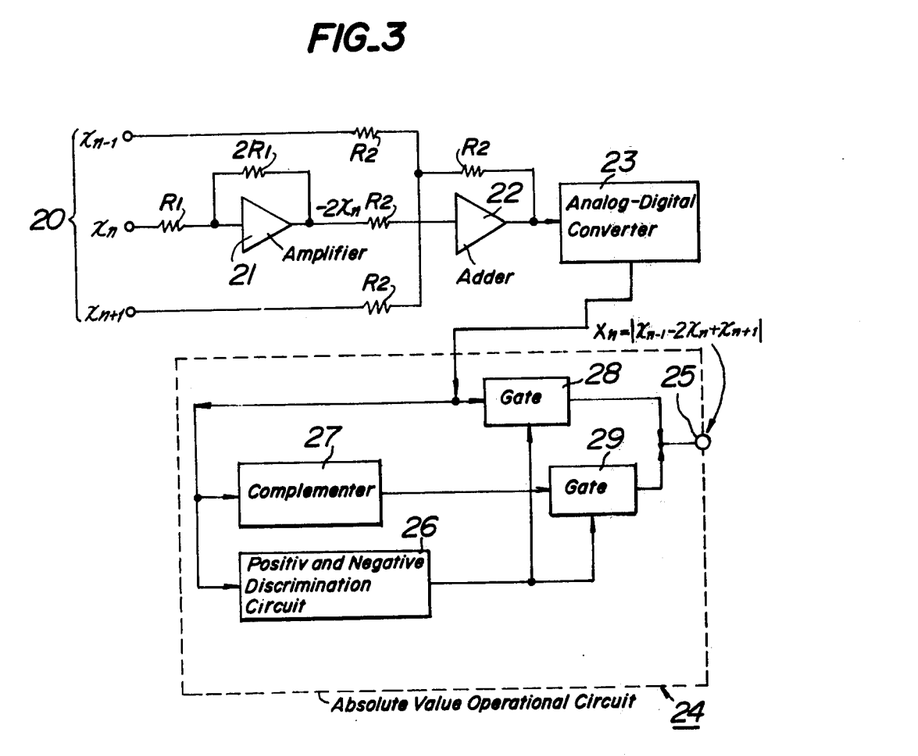
FIG. 3 is a block diagram showing a construction of a part of the circuit elements shown in FIG. 1.

FIG. 3 shows a construction of one embodiment of the local brightness operational circuit 4 shown in FIG. 1 when m=3. In the present embodiment, the picture element distributor 3 functions to deliver, as an analog signal, 3 adjacent picture element signals in parallel to the local brightness operational circuit 4 shown in FIG. 3. Among the brightness signals $x_{n-1}, x_n$ and $x_{n+1}$, delivered to input terminals 20, the brightness signal $x_n$ is amplified to $2x_n$ by means of an amplifier 21 and reversed in polarity to $-2x_n$. Then, an operation of $(x_{n-1} - 2x_n + x_{n+1})$ is effected by an adder 22 to obtain an analog signal $X_n$. This analog signal $X_n$ is converted into a digital signal by means of an analog digital converter 23. In this digital signal, the negative number is represented by complement. This digital signal is supplied to an absolute value operational circuit 24 so as to deliver from its output terminal 25 a digital signal represented by $|x_{n-1} - 2x_n + x_{n+1}|$. That is, the signal supplied to the absolute value operational circuit 24 enters into a positive and negative discrimination circuit 26, complementer 27 and gate 28. If the signal represents a positive number, the positive and negative discrimination circuit 26 functions to deliver a high level output which opens the gate 28 and closes a gate 29. As a result, the signal passes through the gate 28 to the output terminal 25. If the signal represents a negative number (which is represented by complement of 2), the positive and negative discrimination circuit 26 functions to deliver a low level output which opens the gate 29 and closes the gate 28. In addition, the complementer 27 functions to deliver a complement and reverse sign. The output having the reversed sign from the complementer 27 passes through the gate 29 to the output terminal 25. In this way, the output digital signal from the analog digital converter 23 obtains its absolute value and the digital signal corresponding to the absolute value $|x_{n-1} - 2x_n + x_{n-1}|$ appears at the output terminal 25.

Figure 4:
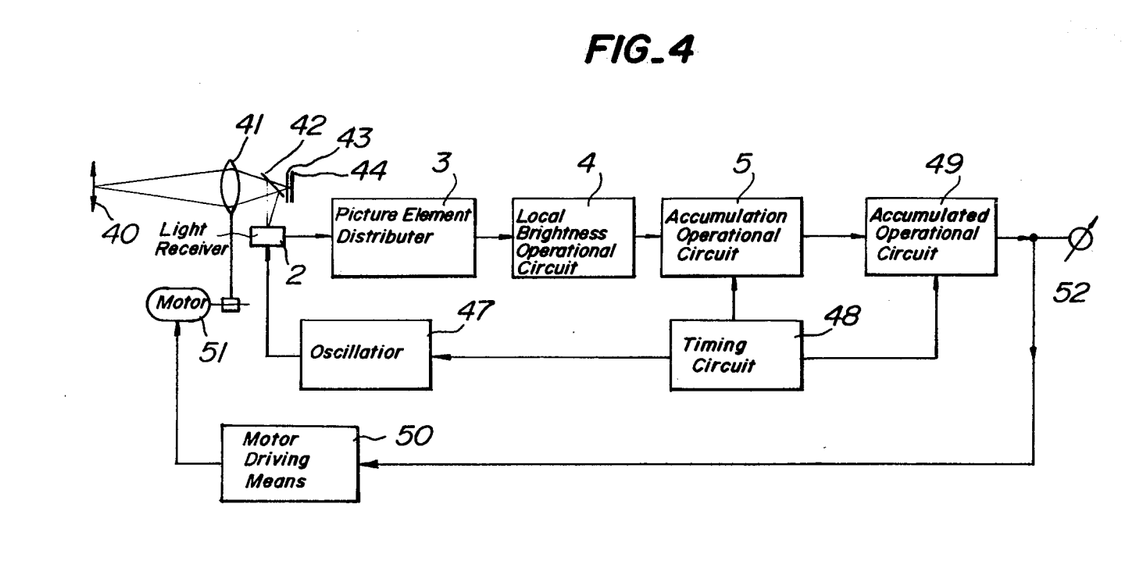
FIG. 4 is a block diagram showing a construction of one embodiment of an automatic focusing device according to the invention.

FIG. 4 shows a construction of one embodiment of an automatic focusing device according to the invention. If m=3, for example, the device will operate as follows. A light from an object 40 passes through a lens 41, a shutter 43 under its open condition and arrives at a film 44. When the focal point of the lens 4 is adjusted, a beam splitter 42 is arranged between the lens 41 and the shutter 43. The light is splitted by the beam splitter 42 and the light thus splitted arrives at a light receiver 2. The light receiver 2 slightly oscillates in front and in the rear of a position corresponding to the film 44, that is, a predetermined focal plane which is conjugate with the film 44.

Figure 5A:
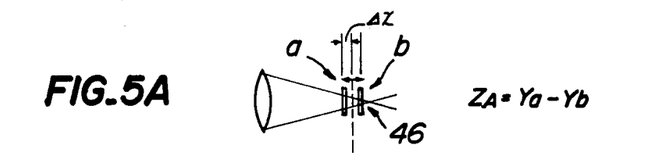
FIGS. 5A, 5B and 5C are diagrammatic views for explaining the operation of the embodiment shown in FIG. 4.
Figures 5B, 5C:
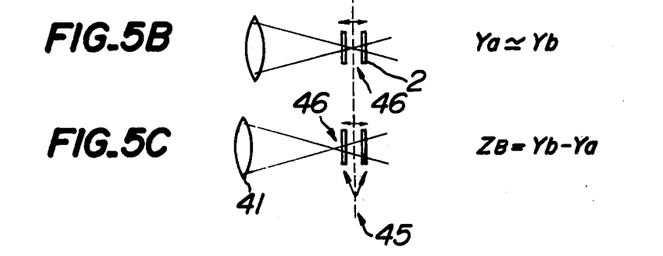

FIGS. 5A and 5B show that the light receiver 2 oscillates in front and in the rear of a predetermined focal plane 45 with an amplitude of $\Delta x$ between positions a and b. FIG. 5A shows that a real focal point 46 is displaced backwardly from a predetermined focal plane 45. FIG. 5C shows that the real focal point 46 is displaced forwardly from the predetermined focal plane 45. FIG. 5B shows that the real focal point 46 coincides with the predetermined focal plane 45, that is, shows that the focusing is correctly effected. In order to oscillate the light receiver 2, provision is made of an oscillator 47 such, for example, as a piezo-electric oscillator, voice coil ocsillator or the like.

As described with reference to FIG. 1, the output from the light receiver 2 is supplied through the picture element distributor 3, local brightness operational circuit 4 to the accumulation operational circuit 5 which functions to deliver as its output the signal Y representing the change in position of the picture image brightness, that is, representing the smoothness of contrast. In practice, provision is made of a timing circuit 48 coupled to the oscillator 47 and accumulation operational circuit 5 such that two signals $Y_a$, $Y_b$ are delivered from the accumulation operational circuit 5 every time the light receiver 2 arrives at the above mentioned positions a and b, respectively. These two signal $Y_a$, $Y_b$ are supplied to an accumulated value comparator 49 which function to deliver a signal $Z = Y_b - Y_a$. This signal Z is supplied to a motor driving means 50 which causes a motor 15 to move the lens 41.

Figure 6A:
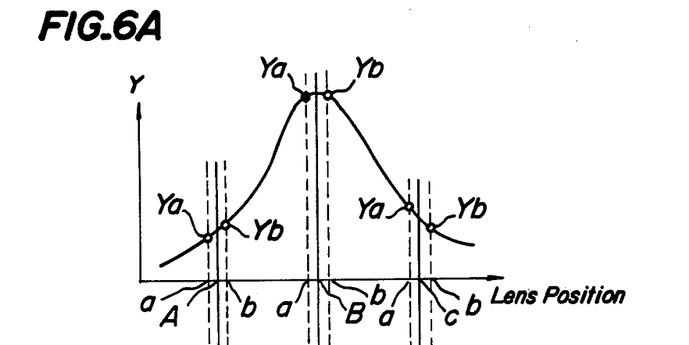
FIGS. 6A and 6B are graphs for explaining the operation of the embodiment shown in FIG. 4.

FIG. 6A shows the above mentioned relation between the signals $Y_a$, $Y_b$ and a distance between the lens 41 and the predeterminal light receiver 2, that is a lens position, the signal Y being taken on the ordinate and the lens position being taken on the abscissa.

Figure 6B:
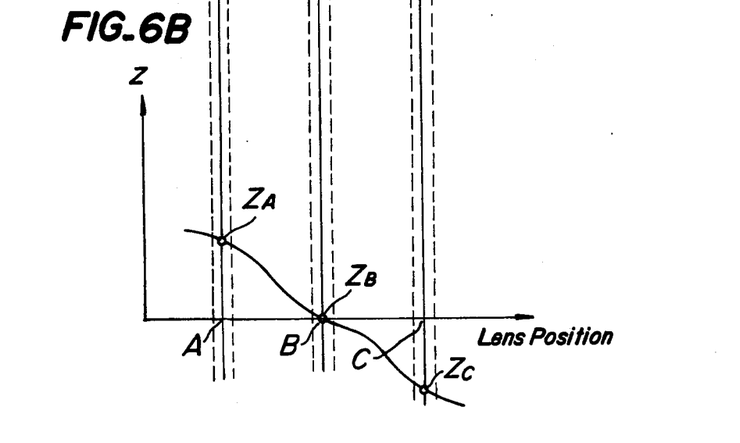

FIG. 6B shows the above mentioned relation between the signal 2 and the distance between the lens 41 and the predetermined light receiver 2, the signal 2 being taken on the ordinate and the lens position being taken on the abscissa. In FIGS. 6A and 6B, points A, B, C on the abscissa correspond to the lens position shown in FIGS. 5A, 5B, 5C, respectively.

Under the condition shown in FIG. 5A, the light receiver 2 oscillates about the point A shown in FIG. 6A between points a and b and the accumulation operational circuit 5 functions to supply the signals $Y_a$, $Y_b$ to the accumulated value comparator 49 which delivers a positive signal $Z_A = Y_a - Y_b$.

This positive signal $Z_A$ is supplied through the motor driving means 50 to the motor 51 which is then rotated in a direction to separate the lens 41 from the light receiver 2. If the lens 41 arrives at the position shown in FIG. 5B, $Y_a \simeq Y_b$ is given as shown by the point B in FIG. 6A. As a result, $Z_b - Y_b - Y_a \simeq$ is given as shown in FIG. 6B and the lens 41 is stopped at the position shown in FIG. 5B.

Under the condition shown in FIG. 5C, the light receiver 2 oscillates about the point C shown in FIG. 6A between points a and b. In this case, as shown by the point C shown in FIG. 6B, a signal $Z_c$ becomes negative. This negative signal $Z_c$ causes the lens 41 to move in a direction to make the distance between the lens 41 and the light receiver 2 small. The lens 41 is stopped at the position shown in FIG. 5B.

The lens 41 may be moved in a continuous manner or may be moved in a stepwise manner. In the case of moving the lens 41 in the stepwise manner, the signal Z for every step may be calculated. The output signal Z from the accumulation operational circuit 49 may be supplied to a meter 52 which can indicate the focal point adjusted condition.

Figure 7:
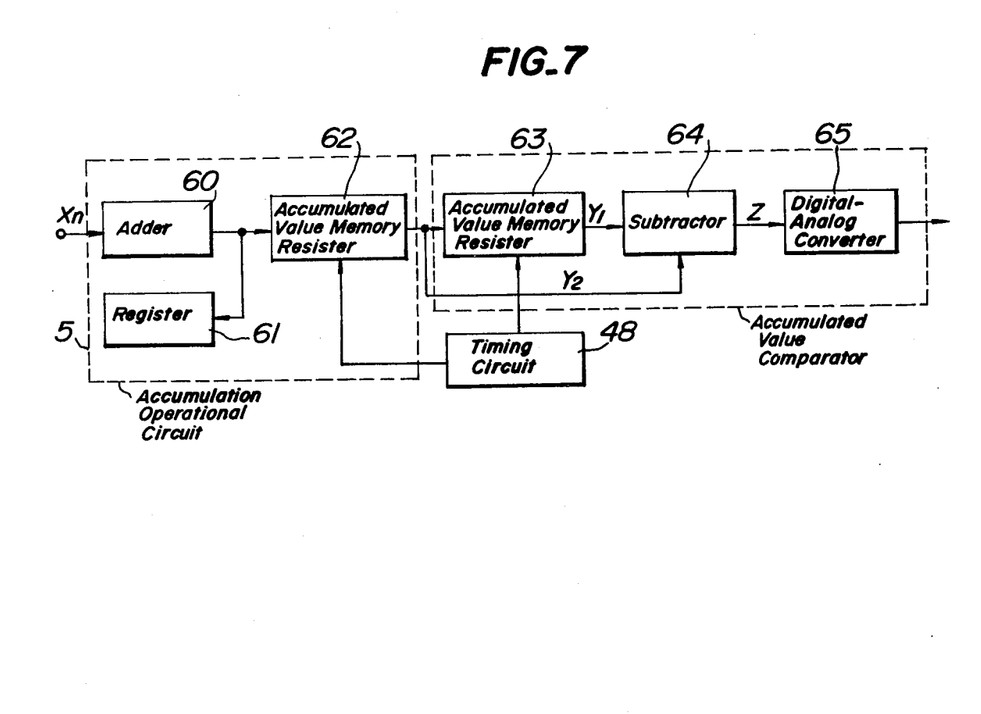
FIG. 7 is a block diagram showing a construction of parts of the embodiment shown in FIG. 4.

FIG. 7 shows one embodiment of the accumulation operational circuit 5 and accumulated value comparator 49. When the light receiver 2 arrives at the position a shown in FIG. 5A, the signal $X_n$ representing $|x_{n-1} - 2x_n + x_{n+1}|$ corresponding to three adjacent picture elements is supplied to an adder 60 to which is also supplied a signal representing $$\sum_{k=1}^{n-1} |x_{k-1} - 2x_n - x_{k+1}|$$

from a register 61. The adder 60 functions to add the signal $X_n$ to the last mentioned signal to obtain $$\sum_{k=1}^{n} |x_{k-1} - 2x_k - x_{k+1}|$$

which is then supplied to the register 61. This operation is repeated for those times which correspond to the number of the picture elements to provide the sum Y of the $X_n$. This Y, for example $Y_a$, is registered in an accumulated value memory register 62.

When the light receiver 2 arrives at the position b shown in FIG. 5A, the sum $Y_b$ is registered in the accumulated value memory register 62. In this case, the sum $Y_a$ is supplied to an accumulated valve memory register 63 provided in the accumulated value comparator 49. The sum $Y_a$ is supplied from the accumulated value memory register 63 to a subtractor 64 to which is also supplied the sum $Y_b$ and the subtractor 64 functions to provide $Z = Y_b - Y_a$ which is delivered to a digital-analog converter 65 and converted into an analog signal. This analog signal is supplied to the motor driving means 50 shown in FIG. 4.

As stated hereinbefore, the invention seeks for the smoothness Y of the picture element brightness change in each lens position and determines such lens position that the smoothness Y becomes maximum. In order to realize such idea, the change of Y is detected when the lens position is minutely changed so as to discriminate the fact that by what direction of movement of the lens can increase Y. That is, when the lens 41 arrives at the position A shown in FIG. 6A, the inclination $Y_b - Y_a$ of Y, that is $Z_A$ shown in FIG. 6B is obtained and the lens 41 is moved in accordance with the inclination $Z_A$.

It is mechanically defficult to minutely move the lens position for the purpose of determining the inclination of Y. As a result, the light receiver 2 is minutely moved by oscillation so as to obtain that effect which is equivalent to the effect exhibited when the lens position is moved.

Figure 8:
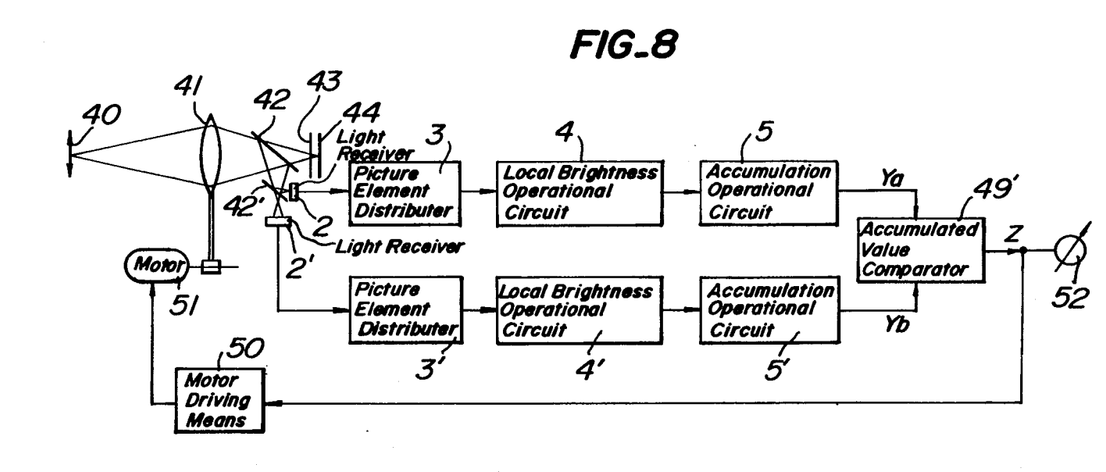
FIG. 8 is a block diagram showing a construction of another embodiment of an automatic focusing device according to the invention.

FIG. 8 shows a construction of another embodiment of automatic focusing device according to the invention. The present embodiment is similar in construction to the embodiment shown in FIG. 4. In the present embodiment, provision is made of two light receivers 2, 2' instead of one oscillatory light receiver 2 shown in FIG. 4. These two light receivers 2, 2' are arranged in front and in the rear of the predetermined focal plane and slightly distant apart therefrom so as to deliver two signals $Y_a$, $Y_b$. In FIG. 8, the parts which are the same in construction as those shown in FIG. 4 are designated by the same reference numerals added with or without dashes.

Figure 9:
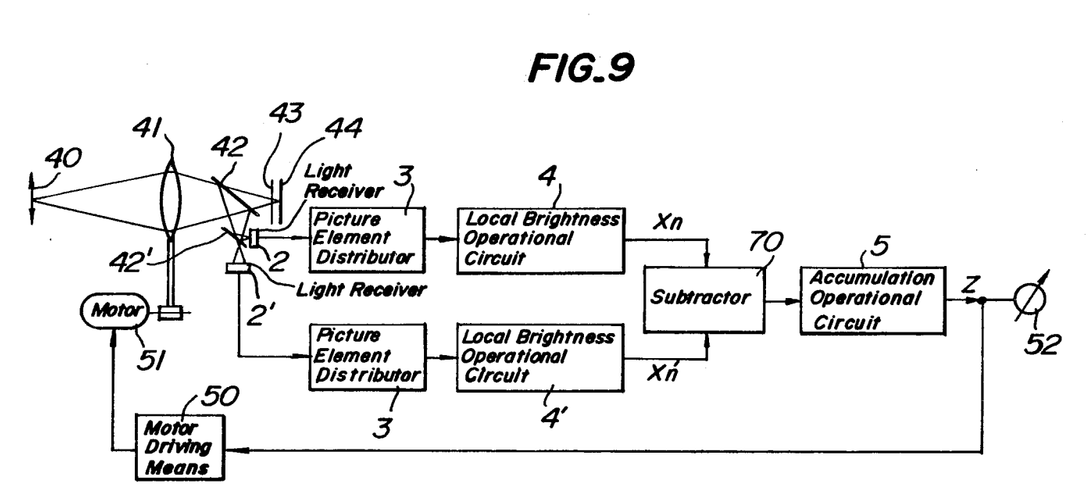
FIG. 9 is a block diagram showing a costruction of a further embodiment of an automatic focusing device according to the invention.

FIG. 9 shows a construction of a further embodiment of an automatic focusing device according to the invention. The present embodiment is similar in construction to the embodiment shown in FIG. 8. In the embodiment shown in FIG. 8, the signals delivered from the two light receivers 2, 2' arranged at position corresponding to the positions a, b shown in FIG. 5A are used so as to calculate the accumulated values $Y_a$, $Y_b$. In the present embodiment, $X_n$ and $X_n'$ delivered from the local brightness operational circuits 4, 4' and relating to the absolute values $|x_{n-1} - 2x_n + x_{n+1}|$ and $|x_{n-1}' - 2x_n' + x_n'+1|$ of picture element, respectively, are directly supplied to a subtractor 70 so as to obtain the difference between $X_n$ and $X_n'$ due to the difference between the positions a, b. The difference signal thus obtained is supplied to the accumulation operational circuit 5 so as to provide the accumulated value representing the smoothness of the contrast relating to all picture elements. The present embodiment, therefore, is simpler in some degree from the embodiment shown in FIG. 8.

The invention is not limited to the above described embodiments only, but various changes and alternations may be made to circuit construction or the like. For example, all of the processes may be made in an analog manner or in a digital manner.

Figure 10A:
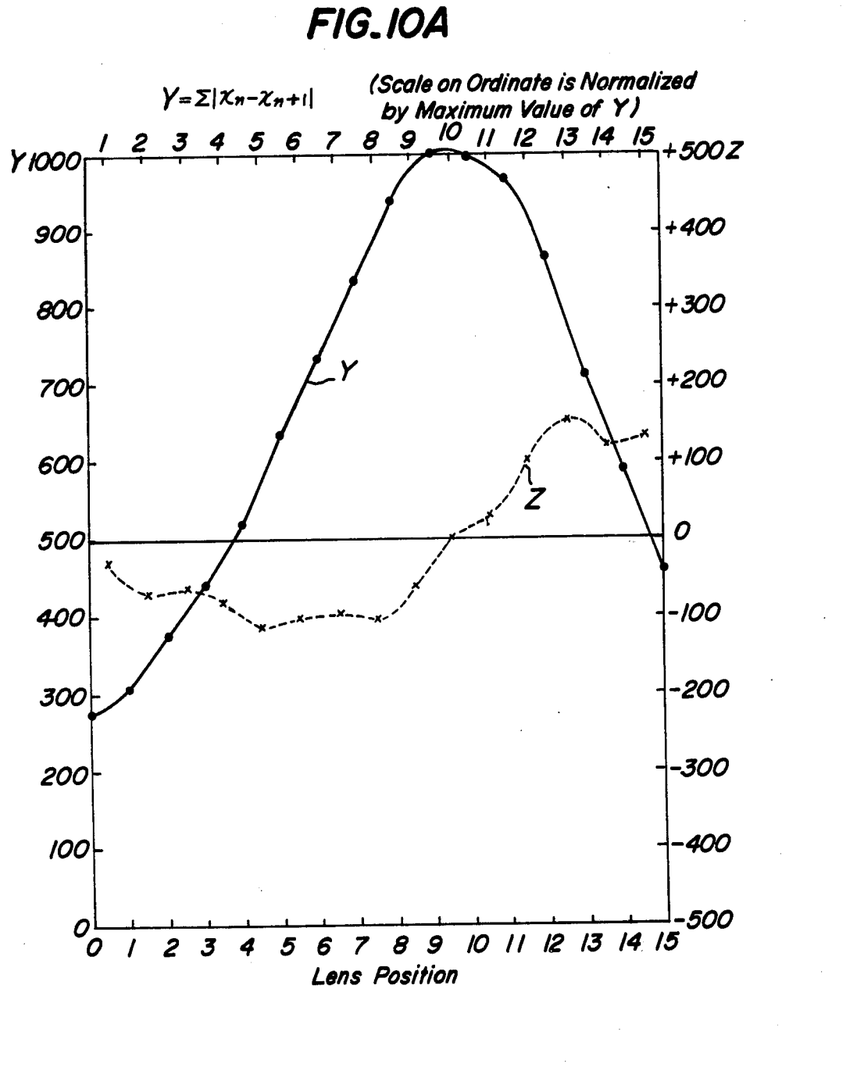
FIGS. 10A and 10B are graphs for explaining how to obtain image forming signals with the aid of an automatic focusing device according to the invention.
Figure 10B:
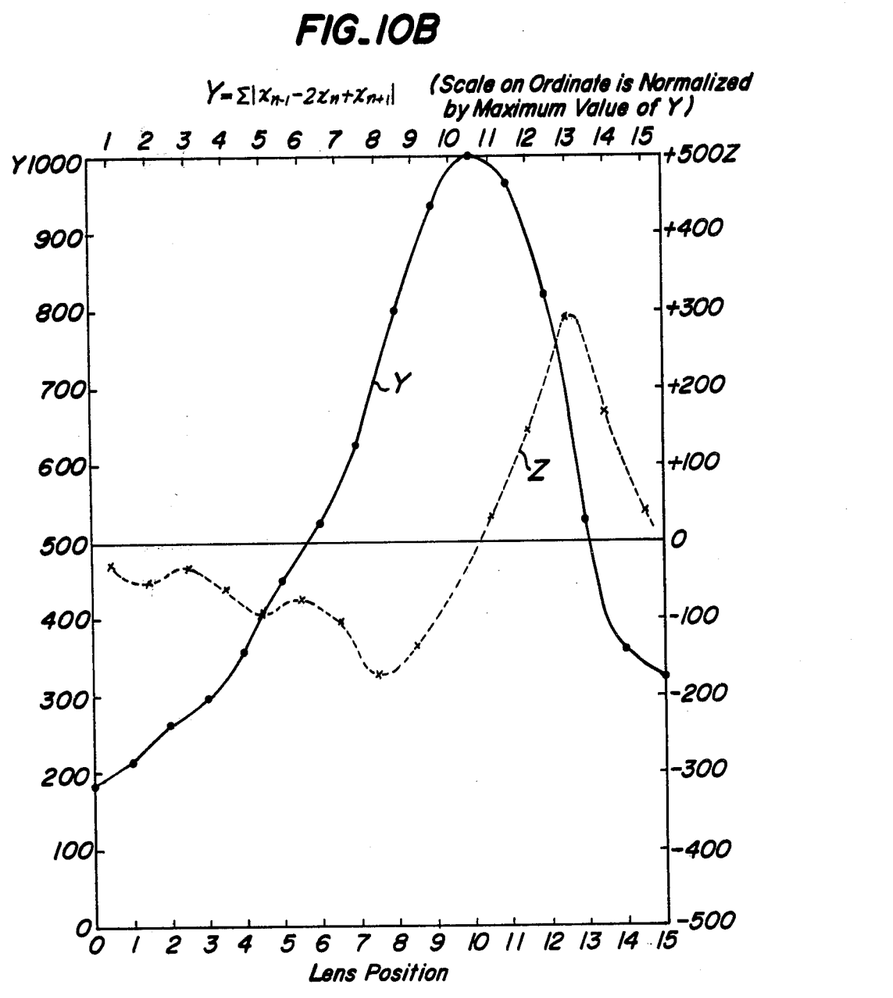

FIGS. 10A and 10B are graphs showing the relation between the image forming signals and the lens position and plotted from the results of experimental tests on the embodiment of the automatic focusing device according to the invention. The graph shown in FIG. 10A is plotted by obtaining a difference of first order of the brightness change from two adjacent picture elements, by obtaining an accumulated value Y of the absolute values of the difference of first order relating to all picture elements and by moving the lens so as to make the accumulated value Y maximum. The accumulated values Y and Z are plotted on the ordinate and the lens position is plotted on the abscissa. The scale on the ordinate is normalized by the maximum value of Y.

The graph shown in FIG. 10B is plotted by obtaining a difference of second order of the change in brightness of three adjacent picture elements, by obtaining an accumulated value Y of the absolute values of the difference of second order relating to all picture elements and by moving the lens so as to make the accumulated value Y maximum. Similarly to FIG. 10A, the accumulated values Y and Z are plotted on the ordinate and the lens position is plotted on the abscissa.

In the graph shown in FIG. 10A, the accumulated value Y gently changes at near the position where the lens is in focus, that is, $Z=0$ is gentle and hence it is not clear where is a correct focal point position.

On the contrary, in the graph shown in FIG. 10B according to the invention, the accumulated value Y rapidly changes even at near the position where the lens is in focus, that is, $Z=0$ and hence it is possible to precisely detect the position where the lens is in focus. In FIGS. 10A and 10B, the inclination of change of the accumulated value Z is shown by dotted lines. That is, the above mentioned Y is shown by a full line and the dotted lines correspond to the above mentioned $-Z$.

As stated hereinbefore, the use of means for providing difference of at least second order of the brightness change under $m \geq 3$ provides the important advantage that it is possible to adjust the focal point of the lens with a high precision.

What is claimed is:

1. An automatic focusing device, comprising: means for generating a focus signal from the photoelectrically determined brightness values of picture elements to control a means for moving the focusing member of an optical system until the focus signal reaches a maximum; means for obtaining m ($m \geq 3$) brightness values of m adjacent picture elements; means for calculating the difference of (m−1)th order (Xn) for a certain number (N) of picture elements; means for calculating $Y(a) = \Sigma X_n{}^p(a)$ and for corresponding calculation of Y(b), the indices (a), (b) designating a certain position of the means for obtaining the brightness values with respect to the optical system and the exponent p designating an integer unequal to zero; and means for calculating the focus signal $Z = Y(a) - Y(b)$.

2. The device according to claim 1, wherein said light receiver is composed of one light receiver adapted to be oscillated between two positions in front and in the rear of a predetermined focal plane.

3. The device according to claim 4, wherein said one light receiver is oscillated by means of an oscillator such as a piezo oscillator or a voice coil oscillator.

4. The device according to claim 1, wherein said light receiver is composed of two light receivers arranged in front and in the rear of a predetermined focal plane, respectively.

5. The device according to claim 1, wherein said light receiver consists of a vidicon camera, charge coupled device, photodiode array, mechanical scanner such as a pin hole scanner, rotary mirror.

6. An automatic focusing device, comprising: means for generating a focus signal from the photoelectrically determined brightness values of picture elements to control a means for moving the focusing member of an optical system until the focus signal reaches a maximum; means for obtaining m($m \geq 3$) brightness values of m adjacent picture elements; means for calculating the difference of (m-1)th order (Xn(a)) and (Xn(b)) for a certain number (N) of picture elements, the indices (a), (b) designating a certain position of the means for obtaining the brightness values with respect to the optical system; means for calculating $D_n = [|X_n(a) - X_n(b)|]^p$, the exponent p designating an integer unequal to zero; and means for calculating the focus signal $$\sum_n D_n.$$

* * * * *